United States Patent [19]

Fink et al.

[11] 4,239,671

[45] Dec. 16, 1980

[54] DISPERSIONS OF HYDROPHILIC ACRYLIC RESINS

[75] Inventors: Herbert Fink, Bickenbach; Klaus Huebner, Ober-Ramstadt-Eiche; Horst Dinklage, Darmstadt-Arheilgen; Hans Ottofrickenstein, Darmstadt-Eberstadt, all of Fed. Rep. of Germany

[73] Assignee: Röhm GmbH, Darmstadt, Fed. Rep. of Germany

[21] Appl. No.: 20,037

[22] Filed: Mar. 13, 1979

Related U.S. Application Data

[63] Continuation-in-part of Ser. No. 955,796, Oct. 30, 1978, abandoned.

[30] Foreign Application Priority Data

Oct. 30, 1978 [DE] Fed. Rep. of Germany ....... 2749386

[51] Int. Cl.³ ............................................. C08L 31/02
[52] U.S. Cl. ........................ 260/29.6 TA; 260/29.6 H; 526/303; 526/304
[58] Field of Search ................. 260/29.6 TA, 29.6 H, 260/29.6 N; 526/303, 304

[56] References Cited

U.S. PATENT DOCUMENTS

| | | | |
|---|---|---|---|
| 3,326,868 | 6/1967 | Tucker ................................. | 260/80.5 |
| 3,459,716 | 8/1969 | Schaefer et al. ..................... | 260/78.5 |
| 3,732,139 | 5/1973 | Fechillas ............................... | 161/170 |
| 3,836,514 | 9/1974 | Fechillas ............................... | 260/86.1 E |
| 3,923,931 | 12/1975 | Fechillas ............................... | 260/885 |
| 3,948,841 | 4/1976 | Dusek .................................. | 260/29.6 TA |
| 4,018,966 | 4/1977 | Antlfinger et al. ................... | 428/423 |
| 4,060,657 | 11/1977 | Iwami et al. .......................... | 428/375 |
| 4,077,926 | 3/1978 | Sanderson et al. .................. | 260/29.6 TA |
| 4,085,260 | 4/1978 | Labana et al. ....................... | 526/16 |

OTHER PUBLICATIONS

Ishikawa et al., "Nonwoven Textiles," Chemical Abstracts 83, 61588h, (1975).
Carlos et al., "Thermoset Coatings," Chemical Abstracts 82, 141773j, (1975).
Mitamura et al., "Antistatic Finishing of Acrylic Fibers," Chemical Abstracts 85, 64748n, (1976).
Masahiko et al., "Polyalkylene Glycol Monoacrylates," Chemical Abstracts 84, 151267c, (1976).

*Primary Examiner*—Earl A. Nielsen
*Attorney, Agent, or Firm*—Curtis, Morris & Safford

[57] ABSTRACT

Aqueous dispersions of copolymers of (1) acrylic or methacrylic acid esters, (2) derivatives of acrylic acid or methacrylic acid having the general formula

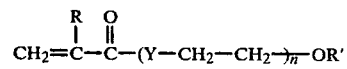

wherein Y is oxygen or a —NR"— group where R" is hydrogen or alkyl having 1–4 carbon atoms, R is hydrogen or methyl, R' is hydrogen or alkyl having 1–4 carbon atoms, and n is an integer from 1 to 25, (3) one or more polymerizable carboxylic acids and/or the salts thereof, and (4) one or more monomers capable of crosslinking the polymer chains. These copolymers are highly water absorbent, and alkali-resistant, and applied as dispersions are well suited for providing a hydrophilic finish to textile fibers and to textiles and non-wovens.

7 Claims, No Drawings

DISPERSIONS OF HYDROPHILIC ACRYLIC RESINS

This application is a continuation-in-part of application Ser. No. 955,796 filed Oct. 30, 1978 now abandoned.

The present invention relates to dispersions of hydrophilic acrylic resins which are suitable for the hydrophilic finishing of fibers or of materials comprising or containing fibers, and to the use of such dispersions.

It often happens that needs arise in different technical sectors which require the solution of one and the same technical problem.

One such problem which occurs in different technical areas is the hydrophilic finishing of materials, particularly the hydrophilic finishing of fibers and of two-dimensional structures composed of fibers. From the point of view of hydrophilicity or hydrophobicity, fibers can be divided into those which are hydrophilic because of their chemical nature and are therefore able to absorb moisture and to transport it and those which neither take up water nor transport it, i.e. thus behave hydrophobically, as well as certain transition forms between these two extremes.

In the textile are, native fibers such as cotton, wool, silk and the synthetic silk fibers are hydrophilic whereas the synthetic fibers of polyesters, polyamides, polyacrylics, polypropylene, polyvinyl chloride, and the polyurethane elastomers must be classified as hydrophobic.

Fibers and textile structures which do not absorb water and cannot transport it exhibit a series of undesirable properties such as an increased static charge, poorer behavior toward soiling and soil removal, inferior wearing comfort, etc.

Thus, in the finishing of textiles the task is presented, on the one hand, not to impair the hydrophilic behavior of hydrophilic fibers and of textiles and non-wovens prepared therefrom and, on the other hand, to make hydrophobic materials hydrophilic with the aid of a finish.

Thus, one aspect of the problem to be solved is the strengthening of materials having an inherent high absorbency in such a fashion that their hydrophilicity is not decreased. For example, in this category are the pre-strengthened (stitched) non-woven fabrics which are subsequently sprayed with a binder and which are to be used as dish cloths. The binder to be employed must accordingly comprise a material which does not behave hydrophobically, that is which itself shows hydrophilic characteristics.

A further aspect of the problem is, for example, in finishing synthetic fibers, particularly those of polyesters and polyamides and the two-dimensional structures formed therefrom. Included therein are also textile weaves and knits, for example those which would be suitable as clothing. The finish is evaluated according to a series of criteria from the standpoint of the user [cf. T. Robinson in "Textilveredlung" 12, 264-268 (1977)], whereby the absorption of moisture, static charge, soiling in the wet and dry condition, and removal of soil on washing and dry cleaning are to be considered critical.

The strengthening and/or finishing of fibers for the improvement of their properties has long been practised. As a rule for finishing textiles a finish, size, or dressing is applied thereto. The nature and application of the finish depends inter alia on the kind of fiber and the use to which it is put. A considerable portion of the finishing agents presently employed are materials comprising a synthetic resin. These agents can be employed in the form of a solution or as an aqueous dispersion.

For the strengthening and/or finishing of two-dimensional textile structures, polymers comprising acrylates or methacrylates are often employed.

In any event, the binding agents and finishing agents heretofore developed are not safisfactory in every respect. The inadequacies which occur arise predominately in connection with an insufficient hydrophilicity of the binder or finish.

It has been shown that the hydrophilicity of acrylate or methacrylate resins, as they are employed in the field of textile coating, can in general be influenced only to an inadequate degree by variation of the basic polymer. By incorporating salts of acrylic acid, methacrylic acid, or other polymerizable acids, the hydrophilicity can, to be sure, be increased—as is to be expected. However, at the same time resistance to water and alkali is degraded. The effect is particularly clearly noticeable if the amount of salt-forming monomers in the total polymer exceeds about 8 percent by weight.

An increase in the hydrophilicity of acrylate coatings or methacrylate coatings can also be achieved by the use of suitable emulsifiers. However, the effect obtained is not permanent because of the relatively easy removal of the surface active agent by washing.

It has now been found that polymers having a very high ability to absorb water and, simultaneously, having very good resistance to alkali are obtained by the copolymerization of (1) esters pf acrylic acid or methacrylic acid with (2) derivatives of acrylic acid or of methacrylic acid having the general formula

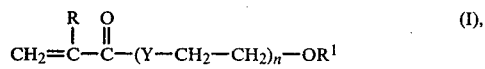

$$CH_2=C-C-(Y-CH_2-CH_2)_n-OR^1 \quad (I),$$
$$\phantom{CH_2=C}|\phantom{C-}||$$
$$\phantom{CH_2=}R\phantom{-C-}O$$

wherein Y is oxygen or a —$NR^2$-group and $R^2$ is hydrogen or alkyl having 1 to 4 carbon atoms, R is hydrogen or methyl, $R^1$ is hydrogen or alkyl having 1 to 4 carbon atoms, and n is an integer from 1 to 25, (3) one or more polymerizable carboxylic acids and/or the salts thereof, and (4) one or more monomers, capable of cross-linking, which effect a joining of the polymer chains. These polymers can be applied from a dispersion and are very well suited for providing a hydrophilic finish to textile fibers and to textiles and non-wovens prepared therefrom.

The polymers prepared in the dispersions according to the present invention preferably contain 5 to 25 percent, by weight of the total polymer, of the acrylic acid or methacrylic acid derivatives of formula (I) in addition to the esters of acrylic acid or methacrylic acid which form the basic polymer, and further comprise one or more acid or salt monomers and one or more cross-linkable monomers for joining the polymer chains. An amount from 10 to 20 percent by weight of a compound of the formula (I) wherein Y is oxygen is preferred. Hydroxyethyl acrylate should be especially mentioned as a compound of formula (I).

The amount of cross-linkable monomer or monomers is preferably from 0.5 to 10 percent by weight of the total polymer. As used in the present specification and claims, the term "cross-linkable monomers" is to be understood as primarily encompassing those known monomers which, in addition to a polymerizable group, contain reactive (functional) groups whose reaction with each other (internal cross-linking) or by way of added polyfunctional compounds (external cross-linking) leads to joining the polymer chains. As reactive groups, amide, acid, nitrile, and particularly N-methylol-amide and N-methylol-ether-amide functions are suitable, for example. These react in a known fashion with reactive groups of the same type or—to the extent that different cross-linkable monomers are present or may be formed—react with other suitable reactive groups as reaction partners and in this way bring about the cross-linking. Monomers of this type include, for example, acrylamide, methacrylamide, N-methylol-acrylamide, N-methylol-methacrylamide, acrylonitrile, acrylic acid, and methacrylic acid. Internal cross-linking can, for example, occur between two N-methylol-amide groups with the formation of a methylol ether or of a methylene-bis compound. Also, the reaction between a N-methylol-amide group and an amide can be used for the formation of a methylene-bis compound. Internal cross-linking can also occur by the reaction of a nitrile group with an amide group. As an example of external cross-linking, the reaction of an amide group with a formaldehyde donor is mentioned, which leads to the aforementioned joined products by way of a N-methylol compound.

In addition to the aforementioned cross-linkable monomers having reacting (functional) groups, monomers having two or more reactive double bonds (for example diols or polyols esterified with methacrylic acid, allyl methacrylate, or allyl cyanurate, etc.) can be used to a lesser degree for joining the polymer chains. Monomers having two or more reactive double bonds as a rule make up not more than 0.1–1 percent by weight of the total polymer, in addition to the cross-linking monomers having reactive functional groups. As examples of monomers having several reactive double bonds, ethylene glycol diacrylate, ethylene glycol dimethacrylate, 1,4-butylene glycol diacrylate, 1,4-butylene glycol dimethacrylate, 1,6-hexanediol diacrylate and dimethacrylate, N,N'-methylene-bis-acrylamide and -bis-methacrylamide, vinyl acrylate and vinyl methacrylate, triallyl cyanurate, and diallyl ether can be mentioned.

The use of 1 to 2.0 percent by weight of N-methylol-methacrylamide together with 0.5 to 1 percent by weight of methacrylamide is particularly mentioned.

Up to 8 percent, suitably from 2 to 7.5 percent, by weight of the total polymer, of one or more polymerizable carboxylic acids and/or the salts thereof can be copolymerized for the preparation of the dispersions of a hydrophilic resin according to the present invention in addition to the aforementioned component Acrylic acid, methacrylic acid, itaconic acid, and other such monoethylenically unsaturated monocarboxylic and dicarboxylic acids are to be considered as belonging to the polymerizable carboxylic acids, for example. As salts, the alkali metal salts are particularly to be mentioned, as well as salts with ammonia and its derivatives.

The use of itaconic acid or its salts in amounts from 2–7.5 percent, preferably 5 percent, by weight of the total polymer should be especially mentioned.

The basic polymers according to the present invention comprise acrylate esters or methacrylate esters which are of a known type for the kind of polymers in question. The monomers can essentially be represented by the general formula (II)

$$CH_2=C(R_3)-C(=O)-OR^4 \quad (II),$$

wherein $R^3$ is hydrogen or methyl and $R^4$ is alkyl having 1 to 4 carbon atoms. Additionally, minor amounts, for example up to 10 percent by weight of the total polymer, of corresponding higher esters having alkyl groups of up to 16 carbon atoms can be copolymerized. 2-ethylhexyl acrylate is mentioned as an example.

The amount of basic polymer in the total polymer is as a rule between 65 and 94.5 percent by weight. A basic polymer comprising ethyl acrylate which, for example, makes up between 75 and 80 percent by weight of the total polymer, should be especially mentioned.

The aforementioned components of dispersed polymer in the hydrophilic resin dispersions according to the present invention are known or can be prepared in a manner known per se. For example, the compounds of formula (I), wherein Y has the meaning —NR²— are made by transesterification of a lower acrylate ester or methacrylate ester with an amine of the formula (III)

$$HN(R^2)-CH_2-CH_2-(Y-CH_2-CH_2)_{n-1}-OR^1, \quad (III)$$

wherein Y, $R^1$, and $R^2$ have their earlier meanings.

The dispersions of hydrophilic resins according to the present invention are prepared by polymerization of the aforementioned components in an aqueous medium in a manner known per se. In general, dispersions having a solids content between 20 and 60 percent are obtained, which can then be diluted or concentrated as desired for application to a substrate.

The polymerization of the monomer can be initiated in conventional fashion by the use of initiators such as hydrogen peroxide, perborates, persulfates, or azo compounds. Also, the reaction can be carried out thermally in a manner like that known for effecting similar emulsion polymerizations. The size of the particles in the dispersions varies from 200 microns to 6000 microns.

The aqueous dispersions of hydrophilic resins according to the invention are characterized by a relatively low viscosity at high solids content.

The dispersions according to the present invention are outstanding suitable for a solution of the problem initially described, namely the hydrophilic strengthening and/or finishing of materials by impregnation, spraying, coating, padding, foaming, printing, etc., in particular of fibers or of two-dimensional structures comprising or containing fibers.

The mechanism and technical accomplishment of the cross-linking processes are per se known. The processes already begin during formation of the polymer film after application of the dispersion to a substrate, i.e. during removal of the water, and are completed by an additional thermal treatment of the dried polymer. For example, a treatment for 30 seconds to 5 minutes at temperatures between 180° C. and 120° C. is recommended, with shorter treatment times at higher temperatures and vice versa.

When amides containing N-methylol groups are employed as cross-linkable monomers, acid catalysis and heat treatment are necessary to achieve an optimum cross-linking.

The dispersions can be used, that is the polymers can be applied to a substrate from the aqueous dispersions, in the usual way.

A better understanding of the present invention and of its many advantages will be had by referring to the following specific Examples, given by way of illustration.

EXAMPLES OF PREPARATION

EXAMPLE 1

0.2 part by weight of the sodium salt of a sulfated addition product of triisobutylphenol and 7 mols of ethylene oxide (emulsifier A) and 0.02 part by weight of potassium peroxodisulfate are dissolved in 61.5 parts by weight of completely desalted water at 80° C. in a polymerization vessel provided with a reflux condenser, stirrer, thermometer, and feed vessel. An emulsion, earlier prepared from 83 parts by weight of ethyl acrylate, 10 parts by weight of methoxy polyethyleneglycol methacrylate [formula (I), n=15], 5 parts by weight of disodium itaconate, 1.2 parts by weight of N-hydroxymethyl methacrylamide, 0.8 part by weight of methacrylamide 2.3 parts by weight of emulsifier A, 1 part by weight of the addition product formed between isononylphenol and 100 mols of ethylene oxide (emulsifier B), 0.18 part by weight of potassium peroxodisulfate, and 94 parts by weight of desalted water, is added dropwise to this solution at 80° C. over a period of 4 hours. After addition is complete, the reaction temperature is kept for one further hour at 80° C. and subsequently the mixture is cooled to room temperature. A coagulate-free dispersion having a solids content of about 40% is obtained.

Emulsifiers A and B used in the following Examples are prepared as in Example 1.

EXAMPLE 2

As in Example 1, an emulsion comprising 83 parts by weight of ethyl acrylate, 10 parts by weight of 2-[2-(methoxyethoxy)ethoxy]ethyl acrylate, 5 parts by weight of potassium methacrylate, 1.2 parts by weight of N-hydroxymethyl-methacrylamide, 0.8 part by weight of methacrylamide, 2.3 parts by weight of emulsifier A, 1 part by weight of emulsifier B, 0.18 part by weight of potassium peroxodisulfate, and 94 parts by weight of desalted water is added dropwise over 4 hours to a solution, warmed to 80° C., of 0.2 part by weight of emulsifier A and 0.02 part by weight of potassium peroxodisulfate in 61.5 parts by weight of desalted water. Subsequently, the material is post-polymerized for one hour with stirring at 80° C. and then cooled to room temperature. A coagulate-free dispersion having a solids content of about 40% is obtained.

EXAMPLE 3

An emulsion of 82.5 parts by weight of ethyl acrylate, 10 parts by weight of 2-[2-(ethoxyethoxy)ethoxy]ethyl acrylate, 5 parts by weight of dipotassium itaconate, 1.5 parts by weight of N-hydroxymethyl-methacrylamide, 1 part by weight of methacrylamide, 2.3 parts by weight of emulsifier A, 1 part by weight of emulsifier B, 0.18 part by weight of ammonium peroxodisulfate, and 94 parts by weight of desalted water are added as in Example 1 over a period of four hours to a solution of 0.2 part by weight of emulsifier A and 0.02 part by weight of ammonium peroxodisulfate in 61.5 parts by weight of water. After addition is complete, the temperature is maintained for one more hour at 80° C. and the mixture is then cooled to room temperature. A coagulate-free dispersion having a solids content of about 40% is obtained.

EXAMPLE 4

Corresponding to Example 1, an emulsion earlier prepared from 78 parts by weight of ethyl acrylate, 5 parts by weight of dipotassium itaconate, 15 parts by weight of 2-hydroxyethyl acrylate, 1.2 parts by weight of N-hydroxymethyl-methacrylamide, 0.8 part by weight of methacrylamide, 2.3 parts by weight of emulsifier A, 1 part by weight of emulsifier B, 0.18 part by weight of potassium peroxodisulfate, and 94 parts by weight of desalted water is added to a solution, warmed to 80° C., of 0.2 part by weight of emulsifier A, 0.02 part by weight of potassium peroxodisulfate, and 61.5 parts by weight of desalted water over a period of 4 hours. Subsequently, the materials are post-reacted for an additional hour at 80° C. and then cooled to room temperature. The dispersion obtained is free of coagulate and contains about 40% solids.

EXAMPLE 5

According to the teachings of Example 1, an emulsion of 72.5 parts by weight of ethyl acrylate, 5 parts by weight of 2-ethylhexyl acrylate, 5 parts by weight of dipotassium itaconate, 15 parts by weight of 2-hydroxyethyl acrylate, 1.5 parts by weight of N-hydroxymethyl methacrylamide, 1 part by weight of methacrylamide, 2.3 parts by weight of emulsifier A, 1 part by weight of emulsifier B, 0.18 part by weight of potassium peroxodisulfate, and 94 parts by weight of desalted water is added over 4 hours to a solution, warmed to 80° C., of 0.2 part by weight of emulsifier A, 0.02 part by weight of potassium peroxodisulfate, and 61.5 parts by weight of desalted water. The material is post-polymerized for one hour at 80° C. and then cooled to room temperature. A coagulate-free dispersion containing about 40% solids is obtained.

Comparison Examples

Dispersions with the following composition of the polymer phase were prepared analogous to Example 1:

(A) 93 parts by weight of ethyl acrylate, 4 parts by weight of N-hydroxymethyl-methacrylamide, and 3 parts by weight of methacrylamide;

(B) 85 parts by weight of ethyl acrylate, 14 parts by weight of butyl acrylate, and,
1 part by weight of N-hydroxymethyl-methacrylamide; and (C) 93 parts by weight of ethyl acrylate, 5 parts by weight of disodium itaconate,
1.5 parts by weight of N-hydroxymethyl-methacrylamide, and 0.5 part by weight of methacrylamide.

Evaluation of hydrophilicity is carried out on films of the polymer and on non-woven fabrics dressed with the aforementioned dispersions.

Preparation of the Polymer Film 12.5 g of the 40% dispersion were poured out into a flat-bottomed Petri dish (diameter=95 mm), uniformly distributed, and subsequently dried at 35° C. for 10–15 hours. The dried films were condensed for 5 minutes at 140° C. while hanging freely.

Evaluation of the Polymer Film (a) Water absorption: A square piece (30×30 mm) is cut out of the condensed film, weighed, and placed for 72 hours at room temperature in tap water. After blotting off the adhering surface water with filter paper, the film is reweighed and measured.

Calculation:

Water absorption in percent = $(A-E)/E \cdot 100$, where
$E$ = initial weight in grams and
$A$ = final weight in grams;
Longitudinal swelling in percent = $(L_2-L_1)/L_1 \cdot 100$, where
$L_2$ = length of an edge after swelling and
$L_1$ = length of an edge before swelling (=30 mm).

(b) Blooming: 1 ml of tap water is slowly dropped onto the condensed polymer film from a pipette and the time taken for white blooms to appear on the film is measured.

Finishing of the fiber non-woven fabric

A stitched non-woven fabric of cellulose/polyester fibers (=70/30) having an area density of 130 g/m² is finished with a dispersion diluted to have a dry solids content of 36% using a Benz laboratory Foulard apparatus.

The bath uptake was 150%.

After drying in a circulating air drying oven at 140° C. for 5 minutes, a strengthened non-woven fabric having a binder content of 35 percent is obtained.

Evaluation of the Finished Non-Woven Fabric (a) Immersion wetting time: According to DIN 53901.

The test apparatus corresponds to that of the DIN standard.

The test sample is the finished non-woven fabric (round disc, diameter=35 mm); the liquid is tap water without additives. The time elapsed until the sample sinks is given in seconds.

(b) Water absorption capacity: A round disc having an area of 100 cm² is cut out of the finished non-woven fabric. 10 ml of tap water (at room temperature) is carefully applied to this surface with a pipette. The absorption and penetration of the water applied through to the opposite side is observed.

The results are summarized in the following Table.

| Dispersion According to | Polymer film | | | Finished Fabric | |
|---|---|---|---|---|---|
| | Water absorption Weight absorbed (%) | Longitudinal Swelling (%) | Bloom time (sec.) | Immersion Wetting Time (sec.) | Water Absorption Capacity |
| Example 1 | 105 | 15 | 45 | 4–6 | Water quickly and completely absorbed |
| Example 2 | 316 | 100 | 40 | 36 | Water quickly and completely absorbed |
| Example 3 | 85 | 10 | 45 | 4 | Water quickly and completely absorbed |
| Example 4 | 300 | 100 | 30 | 1–3 | Water quickly and completely absorbed |
| Example 5 | 200 | 50 | 40 | 5–6 | Water quickly and completely absorbed |
| Comparison Examples | | | | | |
| A | 15 | 0 | 1200 | >3600 | Water remains standing for a lengthy time on the surface and then runs through the places where the fabric is stitched, without being absorbed. |
| B | 20 | 0 | 1200 | >3600 | Water remains standing for a lengthy time on the surface and then runs through the places where the fabric is stitched, without being absorbed. |
| C | 35 | 5 | 60 | 300 | Water absorbed quickly in parts but penetrates extensively. |

What is claimed is:

1. An aqueous dispersion of a hydrophilic copolymer prepared by polymerizing, in an aqueous medium, a monomer mixture comprising: (1) a member selected from the group consisting of lower alkyl acrylates and methacrylates; (2) a compound of the formula

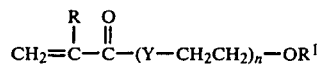

wherein
R is hydrogen or methyl,
$R^1$ is hydrogen or alkyl having 1 to 4 carbon atoms,
Y is oxygen or $-NR^2-$,
$R^2$ is hydrogen or alkyl having 1 to 4 carbon atoms, and n is an integer from 1 to 25; (3) up to 8 percent, by weight of the copolymer, of a member selected from the group consisting of copolymerizable carboxylic acids and salts of such acids; and (4) a mixture of monomers capable of cross-linking said copolymer, said mixture consisting of 1 to 1.5 percent of N-methylol-methacrylamide and 0.5–1 percent of methacrylamide, said percentages being by weight of said copolymer.

2. A dispersion as in claim 1 wherein said copolymerizable carboxylic acids and salts (3) are present in an amount from 2 to 7.5 percent by weight of said copolymer.

3. A dispersion as in claim 1 wherein said compound (2) is present in an amount from 5 to 25 percent by weight of said copolymer.

4. A dispersion as in claim 1 wherein said lower alkyl acrylates and methacrylates are present in an amount from 65 to 94.5 percent by weight of said copolymer.

5. A dispersion as in claim 1 wherein said monomer mixture comprises 76 to 80 percent of ethyl acrylate, 10 to 20 percent of ethylene glycol monoacrylate, 2 to 7.5 percent of a member selected from the group consisting of copolymerizable carboxylic acid and salts thereof, and 0.5 to 5 percent of at least one monomer capable of cross-linking said copolymer, all percentages being by weight of said copolymer.

6. A dispersion as in claim 5 wherein said ethylene glycol monoacrylate is 15 percent by weight of said copolymer.

7. A dispersion as in claim 5 wherein said copolymerizable carboxylic acid or salt thereof is itaconic acid or a salt thereof present as 5 percent by weight of said copolymer.

* * * * *